United States Patent [19]
Marendaz

[11] 3,825,714
[45] July 23, 1974

[54] METHOD AND APPARATUS FOR CONTROLLING THE FEED OF AN ELECTRODE-TOOL RELATIVE TO A WORKPIECE IN ELECTRICAL DISCHARGE MACHINING

[75] Inventor: Georges-Andre Marendaz, Geneva, Switzerland

[73] Assignee: Ateliers des Charmilles S.A., Geneva, Switzerland

[22] Filed: May 15, 1973

[21] Appl. No.: 360,407

[30] Foreign Application Priority Data
May 17, 1972 Switzerland.................... 7292/72

[52] U.S. Cl............ 219/69 G, 219/69 C, 219/69 M
[51] Int. Cl............................................. B23k 9/16
[58] Field of Search..... 219/69 C, 69 M, 69 G, 69 P

[56] References Cited
UNITED STATES PATENTS
3,705,287  12/1972  Saito et al. ........................ 219/69 P
3,739,136  6/1973  Marendaz ........................ 219/69 C

*Primary Examiner*—J. V. Truhe
*Assistant Examiner*—Hugh D. Jaeger
*Attorney, Agent, or Firm*—Hauke, Gifford, Patalidis & Dumont

[57] ABSTRACT

A method and apparatus for controlling the advance, or feed, of an electrode-tool relative to a workpiece in electrical discharge machining, such as to provide maximum material removal efficiency and minimum electrode-tool wear. The control of the advance, or feed, of the electrode-tool is achieved by comparing a reference magnitude of predetermined value with an achieved magnitude depending upon the machining conditions, the achieved magnitude being obtained by measuring the random time delay between the moment at which a machining voltage pulse is applied across the machining gap between the electrode-tool and the workpiece and the moment at which an electrical discharge occurs across the gap.

12 Claims, 4 Drawing Figures

FIG. 1
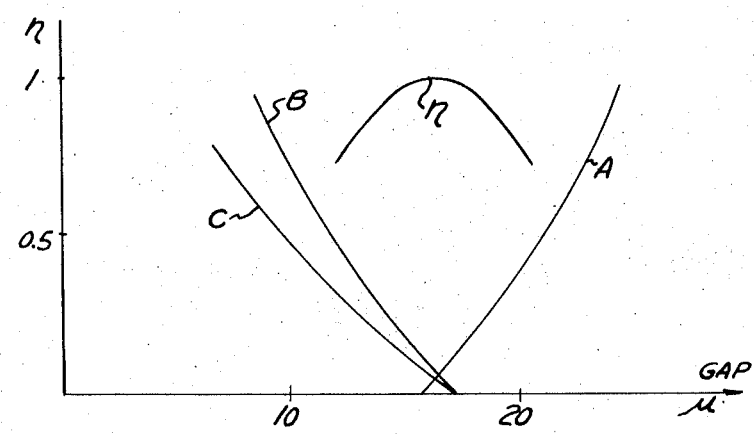
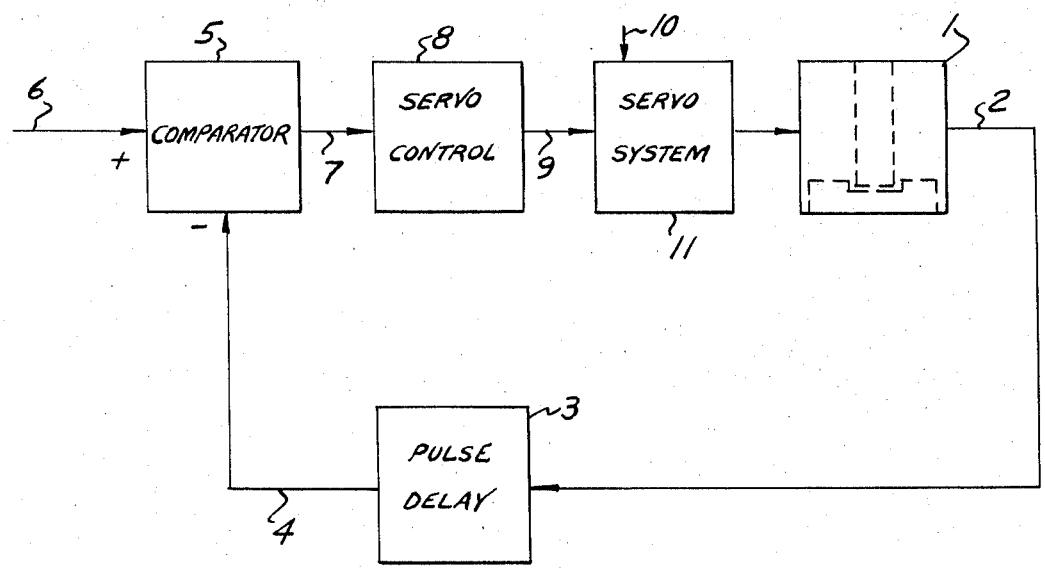
FIG. 2

METHOD AND APPARATUS FOR CONTROLLING THE FEED OF AN ELECTRODE-TOOL RELATIVE TO A WORKPIECE IN ELECTRICAL DISCHARGE MACHINING

BACKGROUND OF THE INVENTION

In electrical discharge machining apparatus (EDM), the machining gap between the electrode-tool and the workpiece is conventionally controlled by means of a servo mechanism which automatically feeds the electrode-tool relative to the workpiece at a predetermined rate of advance. The servo mechanism, generally a hydraulic or electrical servo system, is controlled by command signals derived from the error, or difference, between a predetermined magnitude of reference and an achieved or regulated magnitude as provided as a feedback reference which is a function of the machining condition parameters, for example the average gap voltage between the electrode-tool and the workpiece.

In order to effectuate material removal from the workpiece at a maximum efficiency rate coupled with a minimum wear of the electrode-tool, it is necessary to continuously adapt the servo mechanism control commands to the changing machining conditions. This operation is effected manually by the machine operator, and the required corrections are done by him in an empiric manner as a result of his observations of the machining conditions. This requires considerable skill and experience on the part of the machine operator.

The present invention permits to effectuate such corrections to optimize the machining conditions automatically, such as to approach as close as possible the conditions of maximum machining efficiency and minimum wear of the electrode-tool in every possible condition of machining and under changing conditions, without requiring any special skill on the part of the operator.

Methods and apparatus are known which control the feed or displacement of the electrode-tool as a function of the difference between a reference magnitude and a magnitude achieved at the gap, the latter being generally a function of the voltage between the electrode-tool and the workpiece and/or of the machining current, or yet a combination of both, for example the impedance across the machining gap.

Other means are also known, as for example controlling the feed of the electrode-tools by way of logic signals obtained from at least two of the following machining conditions or parameters: pulse current, control pulse, open circuit voltage pulse and voltage pulse during machining, such as disclosed, for example, in French Patent No. 1,441,743.

It is also known to compare the number of material removing pulse to the number of control pulses and to control the rate of displacement of the electrode-tool by means of logic signals when the ratio of the two numbers differs from a predetermined value, such as is disclosed, for example, in French Patents Nos. 1,376,956 and 1,431,573.

Apparatus are also known which control the electrode-tool feed such as to withdraw the electrode-tool from the workpiece in the event gap short circuits are occurring, such as disclosed, for example, in U.S. Pat. No. 3,035,149.

However, such prior art methods and apparatus, although capable of providing some control over the gap spacing between the electrode-tool and the workpiece, do not permit to achieve the best conditions of machining, that is to provide a maximum material removal rate and a minimum electrode-tool wear rate.

The present invention permits to automatically approach ideal optimum machining conditions, without changing the original machine set-up, as a function of the particular machining characteristics.

SUMMARY OF THE INVENTION

The present invention, therefore, has for its principal object a method and apparatus for controlling the feed or advance of an electrode-tool relative to the workpiece in an EDM apparatus wherein material is removed from the workpiece as a result of applying electro-erosive electrical discharges by means of electrical voltage or current pulses, in which the duration of the pulses is different from the random delay time between the moment at which voltage is applied across the machining gap and the moment at which current flows through the gap, such that the machining gap between the electrode-tool and the workpiece is regulated as a function of the difference between a reference magnitude of a predetermined value and an achieved magnitude depending upon the machining conditions or characteristics, wherein such control is achieved by measuring the time delay interval for each consecutive electrical discharge and deriving the achieved magnitude as a function of the duration of the random delay time intervals.

The present invention will be best understood when the following description of the best mode contemplated for practicing the invention is read in conjunction with the accompanying drawings.

BRIEF DESCRIPTION OF THE DRAWINGS

FIG. 1 is a diagram representing diverse conditions of operation in EDM machining as a function of machining gap spacing;

FIG. 2 is a simplified block diagram of the apparatus of the invention;

DESCRIPTION OF THE PREFERRED EMBODIMENT

Figure 3:
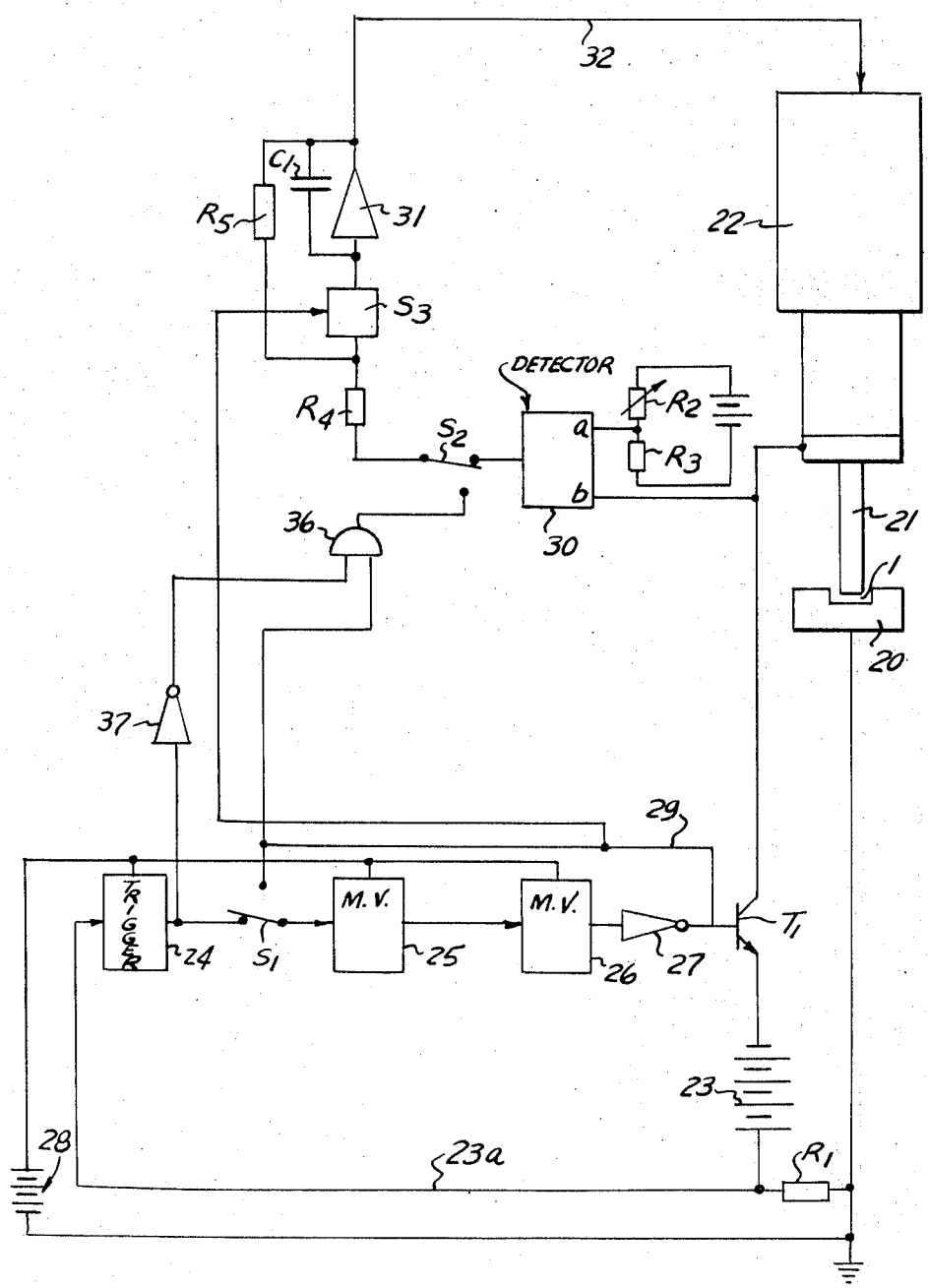
FIG. 3 is a more detailed schematic of the apparatus of the invention.

Referring now to FIG. 1 of the drawing, there is shown a diagram illustrating as a function of the distance between the electrode-tool and the workpiece in an EDM apparatus, or machining gap spacing expressed in microns on the ordinate axis, diverse curves corresponding respectively to the short circuit rate, the rate of average time delays between the establishment of a machining pulse voltage across the gap and the moment at which the electrical discharge begins, the machining efficiency or material removal rate, and the rate of wear of the electrode-tool. Curve A represents the time delay rate variation as a function of the gap spacing, and curve B represents the electrode-tool-workpiece short circuit rate. It can be seen that curves A and B reach their minimum value for a certain gap size, slightly less than $20\mu$ in the example chosen (or approximately .005 in.). Curve C represents the volumetric wear of the electrode-tool as a function of gap spacing, and the wear of the electrode-tool also reaches its minimum value, for substantially the same gap spacing, while curve $\eta$, representing the machining efficiency, reaches its maximum value at substantially the same gap spacing of slightly less than $20\mu$. The diagram of FIG. 1 illustrates the importance of and the advantages derived by maintaining the machining gap spacing at a very precise value. It is obvious that when the gap spacing is greater than the optimum value, the average random time delay, as hereinbefore defined, is increased while when the gap dimension is below the optimum value the short circuit rate increases. In both cases, the efficiency decreases rapidly when the gap spacing is not maintained around the optimum value and, for narrow gap spacing narrower than the optimum value, the electrode-tool wear rate increases rather rapidly.

FIG. 2 represents a schematic block diagram of a system for controlling the machining gap for the purpose of constantly maintaining the machining gap spacing at its optimum value. Block 1 of the block diagram of FIG. 2 arbitrarily represents the machining zone or gap between the electrode-tool and the workpiece. Machining is effected across the gap by way of consecutive pulses having a certain peak voltage. The peak voltage of the machining pulses is sensed and brought by a line 2 to a block, identified by numeral 3, which takes the form of an appropriate electronic circuit for obtaining a magnitude which is a function of the duration of the random time delay interval, as hereinbefore defined. The output of the block 3 is connected by a line 4 to a comparator 5 to which is also supplied an adjustable reference value arbitrarily designated by numeral 6. The signal obtained at the output of the comparator 5 is applied by a line 7 as a command signal for the controller 8 which controls the servo system 11 feeding the electrode-tool towards the workpiece, or the workpiece towards the electrode-tool. The arrow 9 at the output of the controller 8 designates symbolically that the controller causes the electrodetool to advance toward the workpiece at the machining zone 1, therefore tending to narrow or close the machining gap, while the machining or material removal rate, illustrated symbolically by the arrow 10, acts upon the gap in a direction opposite to that of the electrode-tool feed, namely tending to widen or open the gap.

FIG. 3 is a schematic logic circuit diagram of an apparatus for practicing the process of the invention for automatically and adaptively controlling with precision the machining gap spacing between the electrode-tool and the workpiece. As shown at FIG. 3, the machining zone 1 is disposed between the workpiece 20 and the electrode-tool 21, whose displacements toward and away from the workpiece are effected by a servo mechanism 22. The machining voltage pulses across the machining gap, immersed in a dielectric fluid, between the electrode-tool 21 and the workpiece 20 is controlled by a power transistor $T_1$ having its collector-emitter circuit in series in the machining gap circuit and is obtained from a DC source 23 of electrical energy. The power transistor $T_1$, which may consist of a single transistor or of a plurality of parallel transistors, operates as a switch for providing across the machining gap a series of consecutive DC machining pulses supplied by the source 23, as is well known in the art. Other details, such as the dielectric-coolant flow system, have been omitted for the sake of simplification of the description, as they form no part of the present invention.

It is well known that an electrical discharge is not established through the machining zone in coincidence with the establishment of a voltage differential between the electrodetool and the workpiece, such that there is an uncertain time delay, which may randomly vary from one pulse to the next, between the moment at which the peak pulse voltage is applied across the machining gap and the moment at which electrical current begins to flow through the gap between the electrode-tool and the workpiece. A resistor $R_1$ is disposed in the machining circuit such that as soon as current flows across the machining gap the current flowing through the resistor $R_1$ causes a voltage drop across the resistor which is applied by a line 23a to the input of a trigger 24 which supplies at its output a signal of a form depending from the input voltage applied to the trigger. When a double-pole switch $S_1$ is in the position illustrated at FIG. 3, the output signal from the trigger 24 is applied through the switch $S_1$ to a monostable multivibrator 25 controlling in turn a second monostable multivibrator 26 whose output signal is applied, through an inverter 27, to the base of the transistor, or transistors, $T_1$. The trigger 24 and the multivibrators 25 and 26 are connected to a source of electrical energy 28 independent from the source 23. The time constant of the multivibrator 26 determines the duration of the time interval between two consecutive pulses, that is between the trailing edge of a current pulse and the leading edge of the voltage pulse providing the next current pulse across the gap. The multivibrator 25 determines the duration of the current pulse when its input is connected to the trigger 24. For that purpose, as soon as a current pulse appears across the gap subsequently to the application of a voltage pulse across the gap, the trigger 24 provides a signal which causes the multivibrator 25 to return, after a predetermined period of time, to its stable state. When the multivibrator 25 returns to its stable state, it supplies at its output a signal that changes the state of the multivibrator 26 from its stable to its unstable state, and the current flowing through the collector-emitter circuit of the transistor $T_1$ is cut off for the period of time during which the multivibrator 26 is unstable.

The double-pole switch $S_1$ is provided with a second contact, permitting to connect the input of the multivibrator 25, through a line 29, directly to the base of the transistor $T_1$. When the switch $S_1$ is operated to connect the input of the multivibrator 25 directly to the base of the transistor $T_1$, the circuit is capable of providing across the machining gap voltage pulses of constant duration irrespective of the variation of the hereinbefore mentioned random time delays.

The circuit of FIG. 3 also comprises appropriate circuits for measuring the rate of random time delays by way of a detector 30 which takes the form of a differential amplifier having a first input $a$ to which is applied an adjustable voltage reference obtained from a voltage divider formed by a variable resistor $R_2$ and a fixed resistor $R_3$ disposed across a source of reference voltage and a second input $b$ to which the gap voltage is applied, reduced if necessary by means of a voltage divider, not shown. The reference voltage applied to the first input of the differential amplifier 30 is less than the gap voltage in the absence of electrical discharges through the machining gap or, in other words, less than the voltage across the source 23. Thus, the differential amplifier, or detector, 30 provides an output signal only each time the gap voltage is higher than the voltage reference, that is in the course of the time interval during which a voltage pulse is applied across the gap between the electrode-tool and the workpiece without a corresponding electrical discharge occurring through the gap. As soon as an electrical discharge takes place across the machining gap, the voltage across the electrode tool 21 and the workpiece 20 falls below the reference voltage applied to the input $a$ of the detector 30. The output of the detector 30 is connected through a double-pole switch $S_2$ and a resistor $R_4$ to an electronic switch $S_3$, such as to apply the output signal from the detector 30 to the input of an integrator which takes the form of an amplifier 31 shunted by a capacitor $C_1$. The capacitor $C_1$ is in turn shunted by a resistor $R_5$ connected between the output of the amplifier 31 and the input of the electronic switch $S_3$ such that the capacitor $C_1$ discharges through the resistor $R_5$ during the period of time at which the electronic switch $S_3$ conducts.

The control of the electronic switch $S_3$ is effected from the output of the inverter 27 at the output of the monostable multivibrator 26 such that the electronic switch $S_3$ is closed when the transistor $T_1$ conducts, and opened when the transistor $T_1$ does not conduct.

The discharge time constant of the capacitor $C_1$ through the resistor $R_5$ is chosen to be much longer than the duration of the closing and opening of the electronic switch $S_3$, in other words, much longer than the machining pulse period. In this manner, there is obtained at line 32 at the output of the integrator an analog signal having an amplitude depending from the ratio of the random time delays to the machining time periods. This analog signal is applied through the line 32 to the servo mechanism 22, such as to control the advance of the electrode-tool towards the workpiece as a function of the intensity of the output analog signal.

It can thus be seen that at the start of a machining operation, when the electrode tool 21 is too far away from the workpiece 20, in other words when the machining gap is too wide to enable electrical discharges to occur through the gap, the time delay between the establishment of a peak voltage across the machining gap and the occurrence of an electrical discharge is infinite, as there are no electrical discharges, and consequently the output analog signal supplied by the line 32 is maximum, which in turn causes a relatively fast advance of the electrode-tool toward the workpiece. As soon as electrical discharges are established through the machining gap, the time delay period decreases, such that there is caused in turn a decrease of the amplitude of the analog signal at line 32, thus in turn decreasing the speed of advance of the electrode-tool toward the workpiece. As soon as there is no time delay, there is no signal applied by the line 32 to the servo mechanism 22, such that the electrode-tool is no longer advanced towards the workpiece.

In view of the fact that it is advantageous to machine under conditions providing a short time delay, rather than no time delay at all, as indicated by the diagram of FIG. 1, it is preferable to provide appropriate means for insuring that the feed of the electrode-tool into the workpiece is stopped before the signal at the output of the detector 30 becomes non-existent. For that purpose, means may be provided for example for tapping a signal into the line 32, anywhere between the output of the amplifier 31 and the input of the servo control mechanism 22, such signal being of opposite polarity to the one appearing at the output of the amplifier 31. Such opposite polarity signal may be adjusted so as to control the advance of the electrode-tool only when the signal appearing at the output of the amplifier 31 reaches a predetermined magnitude.

The circuit of FIG. 3 also includes an alternative mode of operation permitting to obtain a signal as a function of the random time delay period by means other than the detector 30. To activate such alternative mode of operation, the double-pole switch $S_2$ is actuated to place its movable contact in engagement with a second stationary contact connected to the output of an AND gate 36, such as to connect the input of the integrator, defined by the amplifier 31 and capacitor $C_1$, to the output of the gate rather than to the output of the detector 30. One of the two inputs of the AND gate 36 is connected to the output of the trigger 24 through an inverter 37, while the other input of the gate is connected directly to the base of the transistor, or transistors, $T_1$ through the line 29. In this manner, each time the transistor $T_1$ conducts at the same time that there is no signal at the output of the trigger 24 causing a signal to appear at the output of the inverter 37, that is each time a voltage is applied across the machining gap and the machining current does not yet flow, the gate 36 provides an output signal which is applied to the input of the amplifier 31.

Figure 4:
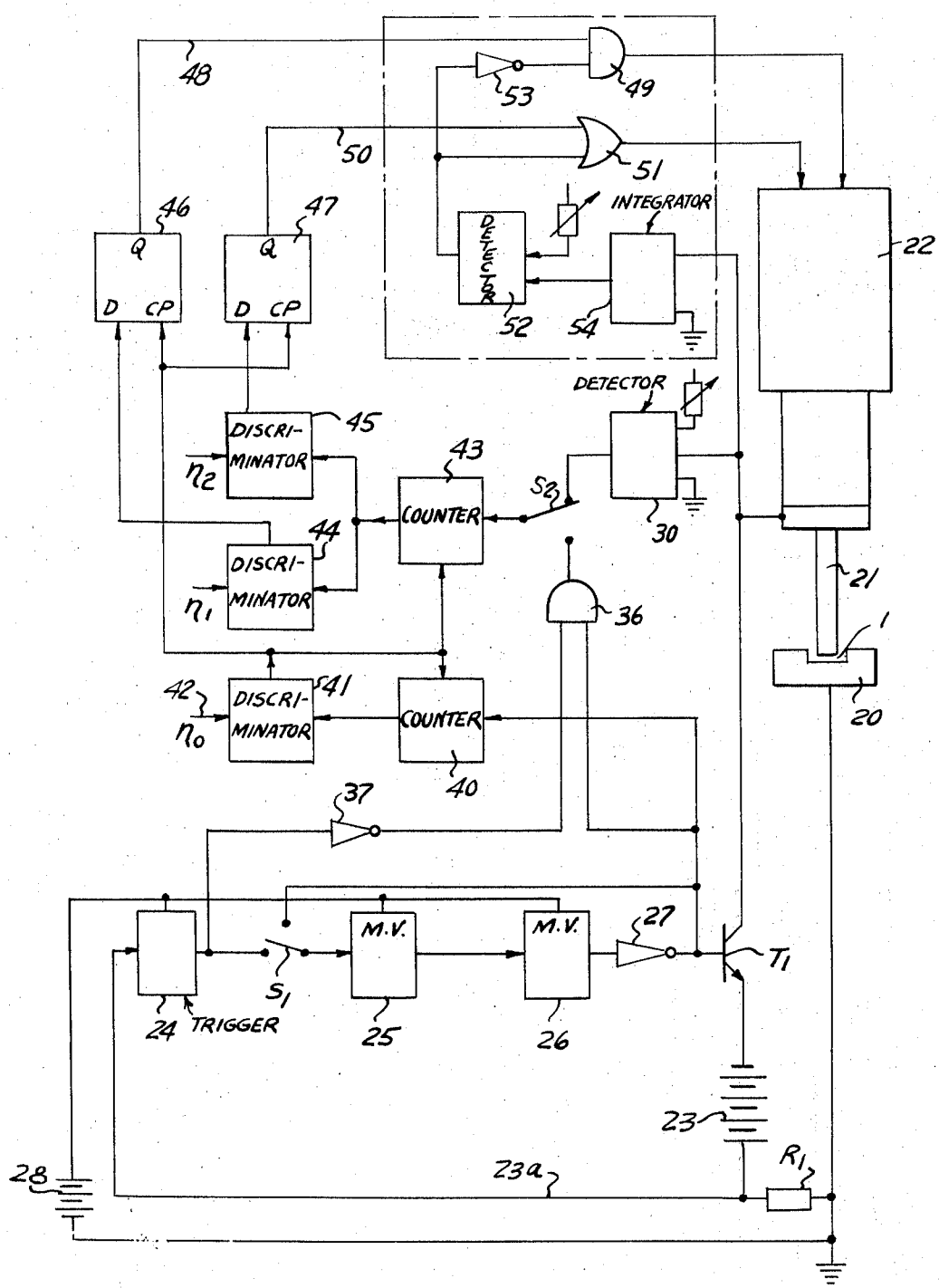
FIG. 4 is a schematic of a modification of the apparatus of FIG. 3.

FIG. 4 illustrates a modification of the invention wherein the amplitude of the command signal causing the electrode-tool to occupy a correct position relatively to the workpiece is obtained as a function of the ratio of the number of pulses for which the time delay interval is larger than a predetermined value to a predetermined number of pulses applied across the machining gap. In the schematic diagram of FIG. 4, the portion of the circuit relating to the pulse generator supplying machining pulses across the gap is the same as that illustrated at Fig. 3 and described hereinbefore. The portion of the circuit diagram of FIG. 4, including the detector 30, the double-pole switch $S_2$ and the AND gate 36, is also the same and functions in the same manner as hereinbefore described.

The circuit of FIG. 4, however, further comprises a pulse counter 40 to which is supplied the control voltage applied to the base of the transistor $T_1$ and which cooperates with a discriminator 41 adapted to provide an output signal which is an indication of whether or not the number of pulses counted by the counter 40 is smaller or larger than a predetermined number, $n_0$, symbolized by the input arrow 42 to the discriminator 41. As soon as the number counted in the counter 40 is larger than the predetermined reference number $n_0$, the discriminator 41 provides a signal which resets the counter 40 back to zero. The reset signal is also applied to a second counter 43 which receives at its input pulses either from the output of the detector 30 or from the output of the AND gate 36 according to the position of the double-pole switch $S_2$. The counter 43 therefore counts the number of pulses for which a time delay precedes the actual current discharge through the gap. The output of the counter 43 is applied to two discriminators, designated respectively by numerals 44 and 45, which are each adjusted to determine whether the number stored at any time in the counter 43 is smaller or larger than a predetermined number $n_1$, as arbitrarily applied to the discriminator 44, or smaller or larger than a predetermined number $n_2$ applied to the discriminator 45.

The signal at the output of the discriminator 44 is applied to an input D of a delay memory 46 which receives at its input CP clock pulses consisting of the reset signals, also applied to the counters 40 and 43, obtained from the discriminator 41. In the same manner, the output from the discriminator 45 is applied to an input D of a delay memory 47 receiving at its other input CP the same clock pulses as supplied to the input CP of the delay memory 46.

The number $n_1$ indicates the minimum number of pulses provided with a time delay which is desired to be obtained within a time interval including $n_0$ pulses. The number $n_2$ indicates the maximum number of pulses provided with a time delay which is acceptable during machining. In practice, the numbers $n_1$ and $n_2$ may be chosen to be very close to each other. At the end of each counting period, as determined by the discriminator 41, a signal is provided at the input D of one or the other of the delay memories 46 and 47 according to whether or not the number of pulses with time delay as provided by the counter 43 is greater than $n_1$ or greater than $n_2$. As soon as the number of counted pulses is comprised between $n_1$ and $n_2$, there is not any signal applied to the input of the delay memory 46 or 47.

When the number of pulses with time delay is smaller than $n_1$, a signal is provided at the input D of the delay memory 46, and at the end of a counting period a signal appears at the output terminal Q of the delay memory 46 which is applied through a line 48 and an AND gate 49 to the servo mechanism 22 to control a retraction of the electrode-tool 21. If, on the contrary, the number of pulses with time delay is greater than the number $n_2$, which indicates that the electrode-tool-workpiece spacing is too wide, a signal is applied by the discriminator 45 to the input D of the delay memory 47, and there appears at the output Q of the delay memory 47 as soon as a pulse is received at its input CP from the discriminator 41, that is at the end of a counting period, a signal which is applied through the line 50 and an input of an OR gate 51 to the servo mechanism 22 for controlling the advance of the electrode-tool 21 towards the workpiece 20, therefore resulting in a decrease of the machining gap.

The AND gate 49 and the OR gate 51 are part of a start-up system which is required for starting the operation of the EDM apparatus. To that effect, the pulse generator, being controlled by the trigger 24 which is controlled in turn by the passage of current through the resistor $R_1$, does not operate as long as at least one electrical discharge does not occur across the gap, and such first electrical discharge cannot take place as long as the electrode-tool is too far from the workpiece. Under such conditions, the voltage of the source 23 is applied continuously across the machining gap. The same voltage is also applied, through an integrator 54 providing an average value of that voltage, to the input of a detector 52 which may take the form of a differential amplifier supplying an output signal as long as the electrode voltage is greater than a reference voltage which is chosen to be slightly less than the voltage across the source 23. When the electrode voltage is above the reference voltage, a signal is supplied by the detector 52 to the servo mechanism 22 through the OR gate 51. This signal is also applied to the input of an inverter 53, with the result that no signal is applied to the second input of the AND gate 49, which inhibits the AND gate and therefore prevents a signal commanding the retraction of the electrode-tool from being applied to the servo mechanism 22.

As soon as an electrical discharge occurs through the gap 1 between the electrode-tool 21 and the workpiece 20, the average voltage of the electrode-tool relative to the workpiece decreases and the detector 52 does not supply a signal at its output. Consequently, the inverter 53 provides at its output a voltage level applied to the second input of the AND gate 49, and the AND gate is enabled and therefore provides to the input of the servo mechanism 22 the output signals from the delay memory 46 through the line 48 connected to the first input of the AND gate 49.

Having thus described the invention by way of examples of structure contemplated for practicing the method of the invention, what is claimed as new is as follows:

I claim:

1. A method for controlling the positioning of an electrode-tool relative to a workpiece in electrical discharge machining wherein controlled electrical voltage pulses are applied across a machining gap between the electrode-tool and the workpiece causing current pulses to flow across said gap, the duration of said current pulses being randomly different as a result of random variation of the time delay interval between the moment at which voltage is applied across the gap and the moment at which a discharge occurs across the gap, said method comprising automatically setting the spacing of said gap as a function of a command magnitude representing the difference between a reference magnitude of predetermined value and a control magnitude, wherein the duration of said time delay interval is measured and said control magnitude is derived as a function of the duration of said time delay interval.

2. The method of claim 1 wherein said control magnitude is a function of the average duration of said time delay interval.

3. The method of claim 1 wherein said control magnitude is a function of the average ratio of the duration of said time delay interval to the duration of the time interval comprised between the beginning of a voltage pulse and the beginning of a subsequent voltage pulse.

4. The method of claim 1 wherein said control magnitude is a function of the average ratio of the duration of said time delay interval to the duration of a voltage pulse.

5. The method of claim 1 wherein said control magnitude is a function of the average ratio of the duration of said time delay interval to the duration of a current pulse.

6. The method of claim 1 wherein said control magnitude is a function of an electrical signal obtained from the ratio of the number of pulses for which the duration of said random time delay interval is greater than a predetermined value to a predetermined number of pulses applied across the machining gap.

7. The method of claim 1 wherein said control magnitude is a function of an electrical signal obtained during a predetermined time interval from the ratio of the number of pulses for which the duration of said random time delay interval is greater than a predetermined value to the number of pulses applied across the machining gap during the same time interval.

8. An apparatus for controlling the feed of an electrode-tool towards a workpiece in electrical discharge machining wherein electro-erosive electrical discharges are applied across a machining gap defined between said electrode-tool and said workpiece, the duration of said discharges being randomly different as a result of random variation of the time delay interval between the moment at which voltage is applied across the gap and the moment at which a discharge takes place across the gap, said apparatus comprising means for controlling the advance of the electrode-tool as a function of the difference between a reference magnitude of predetermined value and a control magnitude, means for providing a pulse signal of a predetermined amplitude and of a duration equal to that of said random time delay interval, and means for converting said pulse signal into said control magnitude for providing a signal controlling the displacement of said electrode-tool relative to said workpiece.

9. The apparatus of claim 8 comprising means for providing a logic signal which varies in level when the peak machining voltage amplitude is greater than a predetermined level higher than that of the normal machining voltage during a current pulse.

10. The apparatus of claim 9 comprising means of obtaining an analog magnitude representative of the average value of said logic signal and means for controlling the advance of said electrode-tool as a function of the difference between a reference magnitude of predetermined value and said analog magnitude.

11. The apparatus of claim 10 comprising means for storing the value of said analog magnitude during the time interval comprised between two consecutive voltage pulses.

12. The apparatus of claim 9 comprising means for counting the number of pulses supplied by said logic signal during each successive train of pulses each including a predetermined number of voltage pulses applied across the machining gap, means for obtaining from the difference between said number and at least a predetermined number at least two control signals for the displacement of said electrode-tool, and means for storing said signals during a comparison period.

* * * * *